United States Patent [19]
Saha et al.

[11] Patent Number: 5,367,425
[45] Date of Patent: Nov. 22, 1994

[54] METHOD AND DEVICE FOR PREVENTING UNDERSTABILIZATION OF LONGITUDINAL DIFFERENTIAL PROTECTION IN CASE OF EXTERNAL FAULT AND CURRENT TRANSFORMER SATURATION

[75] Inventors: Murari M. Saha; Per Wennerlund, both of Västerås, Sweden

[73] Assignee: Asea Brown Boveri AB, Västerås, Sweden

[21] Appl. No.: 59,854

[22] Filed: May 11, 1993

[30] Foreign Application Priority Data

May 22, 1992 [SE] Sweden ................ 9201618

[51] Int. Cl.$^5$ ............................ H02H 3/32
[52] U.S. Cl. ................... 361/63; 361/65; 361/87
[58] Field of Search ............. 361/110, 63, 65, 84, 361/87, 82

[56] References Cited

U.S. PATENT DOCUMENTS

| | | | |
|---|---|---|---|
| 4,377,834 | 3/1983 | Eriksson et al. | 361/82 |
| 4,731,689 | 3/1988 | Nimmersjo et al. | 361/66 |
| 5,202,812 | 8/1993 | Shinoda et al. | 361/65 |

FOREIGN PATENT DOCUMENTS

0506035A1 9/1992 European Pat. Off.
9100917-5 11/1992 Sweden.

OTHER PUBLICATIONS

*High–Speed Distance Relaying Using a Digital Computer;* Gilcrest et al.; Paper No. 71TP 566-PWR; IEEE Power Engineering Society; May 27, 1971; pp. 1235–1243.

*Primary Examiner*—Todd DeBoer
*Attorney, Agent, or Firm*—Watson Cole Grindle & Watson

[57] ABSTRACT

A method and a device for preventing understabilization of longitudinal differential protections in case of external faults and current transformer saturation. The invention comprises an extension of the state of the art with regard to stabilization of longitudinal differential protections in such a way that the values (A1, A2, ... An), ($\phi$1, $\phi$2, ... $\phi$n), obtained via current measurement (C1, C2, ... Cn) and Fourier filters (4, 5, 6), for determining the function characteristic of the protection under certain conditions as regards current amplitude and current transformer saturation are given corrected values (A1k, A2k, ... Ank), ($\phi$1k, $\phi$2k, ... $\phi$nk) (FIG. 2).

4 Claims, 2 Drawing Sheets

METHOD AND DEVICE FOR PREVENTING UNDERSTABILIZATION OF LONGITUDINAL DIFFERENTIAL PROTECTION IN CASE OF EXTERNAL FAULT AND CURRENT TRANSFORMER SATURATION

TECHNICAL FIELD

A differential protection is a type of protection used for preventing damage which may arise in connection with internal faults on busbars, generators, motors, transformers, power lines, etc.

The requirements on the protections are somewhat different depending on the object to be protected. An unwanted protective function must be prevented and this can be done by stabilizing the protections. This means that attempts are made to make the protections unsusceptible to certain internal and external electrical transients and to external electrical faults. It is necessary, for example, to prevent inrush current surges, overmagnetization currents, continuous currents, saturation of current transformers, etc., from leading to an unwanted protective function. However, there is always a certain risk that the stabilization measures are insufficient in the case of external faults.

The present invention relates to a special stabilizing problem which may arise in a longitudinal differential protection when current transformers included in the protection become saturated owing to an external fault, that is, when the protection is to be stabilized so as not to enter into operation.

BACKGROUND ART, THE PROBLEM

Figure 1:
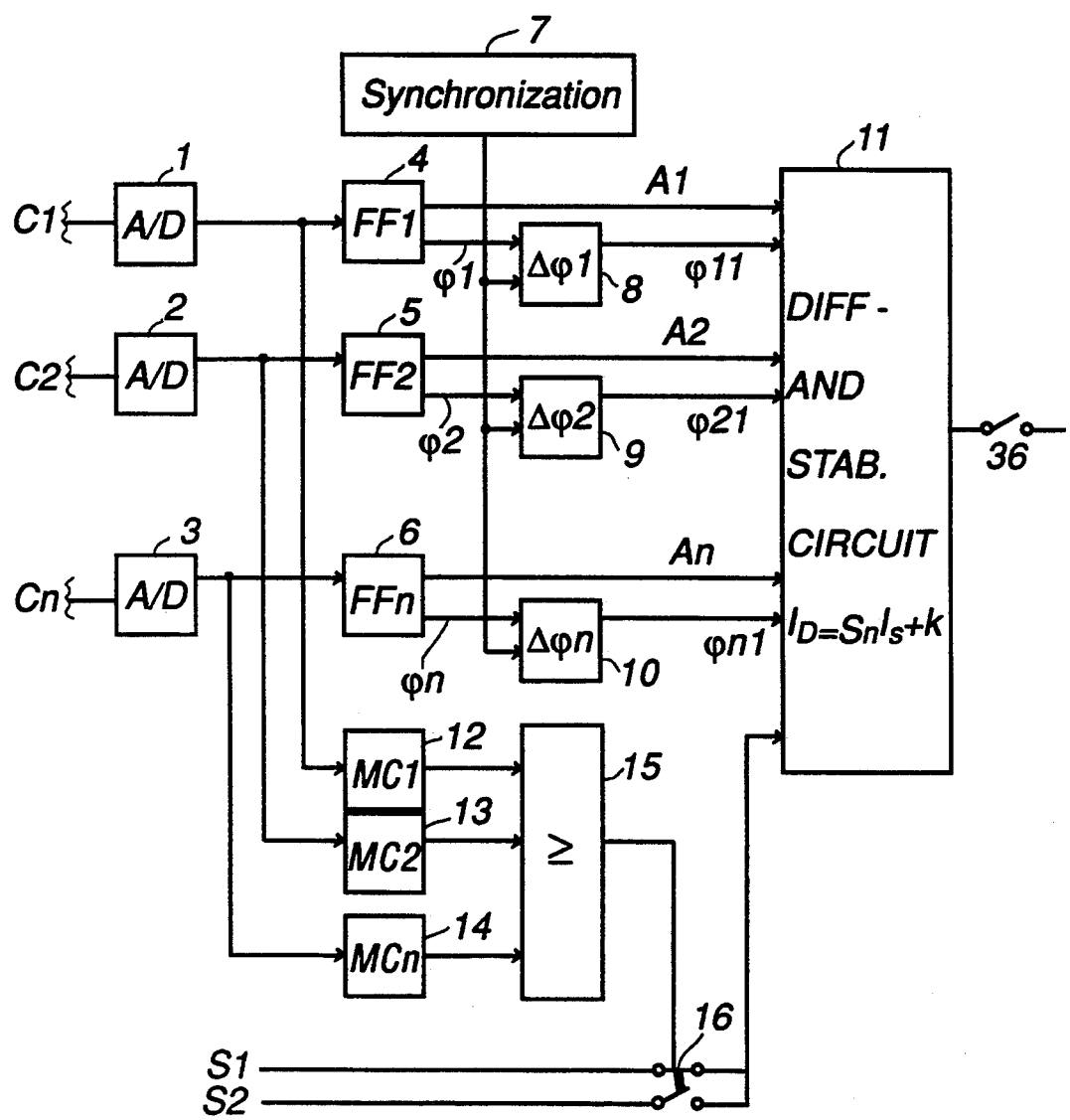
FIG. 1 shows, in principle, how, according to the state of the art, a differential protection changes its degree of stabilization when current transformer saturation occurs.

The stabilization measures for longitudinal differential protections for different fault conditions have been described in a large number of patent specifications. A relatively comprehensive description of the prior art is given in patent application SE 9200406-8, corresponding to U.S. patent application Ser. No. 998,725, in the name of Eriksson et al., filed Dec. 30, 1992 and assigned to the same assignee as the subject application. From this it is clear, inter alia, that known problems in connection with differential protections are that they exhibit deficiencies with respect to stability for external faults and for networks with a large short-circuit power. In addition, false difference currents may arise in case of external faults because some of the current transformers becomes saturated. However, current transformer saturation may be detected in accordance with several known methods, see, for example, SE 9100917-5(now issued as Swedish patent 9100917-5, and corresponding to EP application EP 0 506 035 A1). Information that saturation has occurred may be used for stabilization of a differential protection, which, however, entails a certain risk of both overstabilization in case of an internal fault and under-stabilization in case of an external fault.

Differential protections are often designed such that two different circuits can be distinguished, namely, a differential circuit and a stabilizing circuit. The protection functions such that the difference current $I_D$, which upon an internal fault arises between incoming and outgoing currents, can be separated with the aid of the differential circuit.

The current which is used to stabilize the protection, $I_S$, in some way emanates from the stabilizing circuit and it may be different for different protections, depending on what is primarily to be stabilized against and on the technique used as well as the design of the protection in other respects. For example, the stabilizing current may be a reflection of the incoming current, obtained by means of a current transformer, for busbars, for example, the sum of reflected incoming currents, any of its components, or the like.

The function characteristic of a differential protection constitutes a graphic representation of the differential current as a function of stabilizing current, stabilizing degree S and a function margin K, which is often expressed as $$I_D = S \cdot I_S + K$$

To prevent operation of the longitudinal differential protection when saturation occurs and when saturation has been detected, the stabilizing degree is changed to a higher value such that a higher differential current is needed to obtain operation.

The above-mentioned method has its deficiencies, in particular if only one of the current transformers has become saturated. This is due to the fact that in such a case a large measured differential current may be obtained which may exceed the level of stabilization according to the function characteristic which is obtained in the case of a saturated transformer. This leads to a situation with understabilization of the longitudinal differential protection.

A problem which arises in this connection is to effect a suitable stabilizing signal. Admittedly, it is possible to determine in various ways whether a current transformer has become saturated. However, to achieve an optimal stabilization, that is, neither overstabilization nor understabilization of the longitudinal differential protection in case of an external fault which entails current transformer saturation, it would be desirable to obtain a signal which is in some way connected to the degree of saturation.

One way of obtaining a relevant signal is disclosed in patent application SE 9200011-6, corresponding to U.S. patent application Ser. No. 992,130, in the name of Bjorklund et al., filed Dec. 17, 1992 and assigned to the same assignee as the subject application, in which, with the aid of discrete-time measurements of the secondary current of a current transformer, both the primary current and the secondary current are reconstructed upon saturation via a signal model and a current transformer model. This solution, however, requires access to a computer with a very high calculation capacity.

By an extension, according to the invention, of the prior art described, it is, however, possible by relatively simple means to achieve a considerable reduction of the risk of understabilization in the case of current transformer saturation.

To be able to describe the invention, a somewhat more detailed description of the state of the art is needed than the summary description above where it is stated that, when saturation is indicated, an increase of the stabilizing degree takes place. Therefore, the state of the art will now be described with reference to FIG. 1.

A differential protection is associated with a number, n, of terminals with current measurement in each phase. To simplify the description, FIG. 1 only shows one current transformer C1, C2 ... Cn from each terminal. The measured values of the current transformers are converted into sampled digital values in the A/D converters 1, 2 and 3. Via Fourier filters FF1, FF2 and FFn with reference numerals 4, 5 and 6, the fundamental component of each of the measured currents is obtained as a current vector characterized by an amplitude and a phase angle, that is, as A1 and $\phi1$, A2 and $\phi2$ as well as An and $\phi$n. The amplitudes obtained in this way will hereinafter be referred to as "Fourier amplitudes". Since there may be quite a significant geographical variation between the locations of the current transformers, a synchronization of the measured phase angles is normally needed, which takes places with the aid of a global clock 7. The synchronization is performed with the amounts $\Delta\phi1$, $\Delta\phi2$ and $\Delta\phi$n via the synchronization units 8, 9 and 10. The phase angles $\phi11$, $\phi21$ and $\phi$n1 thus adjusted are supplied together with the Fourier amplitudes and the current stabilizing degree to a decision unit 11. This comprises the previously mentioned circuits for obtaining differential and stabilizing currents and determines the current function characteristic depending on whether or not any of the current transformers exhibits saturation. Information about this is obtained via any of the saturation detectors MC1, MC2 and MCn with reference numerals 12, 13 and 14. If any of these signals saturation, the stabilizing degree is switched, via an OR element 15, from the lower stabilizing degree S1 to the higher stabilizing degree S2 with the aid of a contact system 16. When the limits of the function characteristic are exceeded, the necessary protective measures are activated via the contact 36.

As mentioned above, the amplitude values which are obtained via the Fourier filtering represent the amplitude of the fundamental component, that is, they are freed from any superimposed harmonics, d.c. components and other noise. In these contexts it is common for the Fourier filtering to be based on some 20 samples per cycle.

There are also other methods for amplitude determination of the measured currents. One such method comprises finding out the peak value with the aid of two consecutive sample values for each cycle. Such a method is described, inter alia, in "High-Speed Distance Relaying Using a Digital Computer, Part 1-System Description", IEEE Trans. on Power Apparatus and Systems, Vol-91, No. 3, May/June 1972, pp. 1235-1243 by G. B. Gilchrest, G. D. Rockefeller and E. A. Udren. The peak values which are obtained in this way under normal conditions, that is, before any saturation occurs, are relevant measured values which correspond to the Fourier amplitudes. However, when during saturation or other states, harmonics, d.c. components etc. occur, peak values determined by this method will be influenced.

SUMMARY OF THE INVENTION, ADVANTAGES

As already mentioned, the invention relates to a method and a device in the form of an extension of the state of the art with regard to stabilization of a longitudinal differential protection during current transformer saturation. When saturation has been indicated in any of the current transformers included in the protection, the extension comprises, inter alia, under certain conditions as regards measured amplitude values, performing a correction of the amplitude and phase angle of the current vectors obtained via the Fourier filters. The values thus corrected are supplied to the circuits for determining the differential and stabilizing currents prevailing at the time. This will also cause the function characteristic to become corrected. Independently of whether the above-mentioned conditions are fulfilled or not, a higher stabilizing degree will be switched in at current transformer saturation, as is the case in the state of the art.

According to the invention, in addition to determining the amplitude via the Fourier filters, a parallel amplitude determination takes place with the aid of the above-described method where the peak value is found out with the aid of two consecutive sample values for each cycle. Via holding circuits, the last determined peak values, hereinafter called "holding amplitudes", are stored consecutively. These values are compared with the respective Fourier amplitudes. If a holding value is somewhat greater than the corresponding Fourier amplitude and if at the same time saturation has been detected, the above-mentioned correction of the amplitude and phase position of the current vector(s) concerned is carried out.

The extension described above, that is, the correction of the amplitude and phase angle of the current vector, obtained via the Fourier filters, which is carried out according to the invention, means a simple way of considerably reducing the above-mentioned risk of understabilization at current transformer saturation in case of an external fault. This can be explained as follows: Owing to the technique used to obtain the Fourier amplitude, depending on where during the cycle a saturation occurs, the Fourier amplitude may have a relatively low value even though saturation has been detected. To avoid understabilization in such a case, the current vector is corrected by giving the Fourier amplitude a higher value and reducing the phase angle to a lower value. In this way, also the function characteristic will be increased while at the same time the stabilizing degree is increased because of the detection of saturation. The decision as to whether this correction is to be carried out is based on, in addition to saturation being detected, the magnitude of the holding amplitude in relation to the Fourier amplitude. If the holding amplitude is greater than the Fourier amplitude multiplied by a first constant, this is equivalent to the Fourier amplitude having a relatively low value, and then correction of the amplitude and phase angle of the current vector is to take place. If the opposite situation prevails, no correction of amplitude and phase angle is needed although saturation has been detected. In this case it is sufficient to increase the stabilizing degree.

DESCRIPTION OF THE PREFERRED EMBODIMENTS

Figure 2:
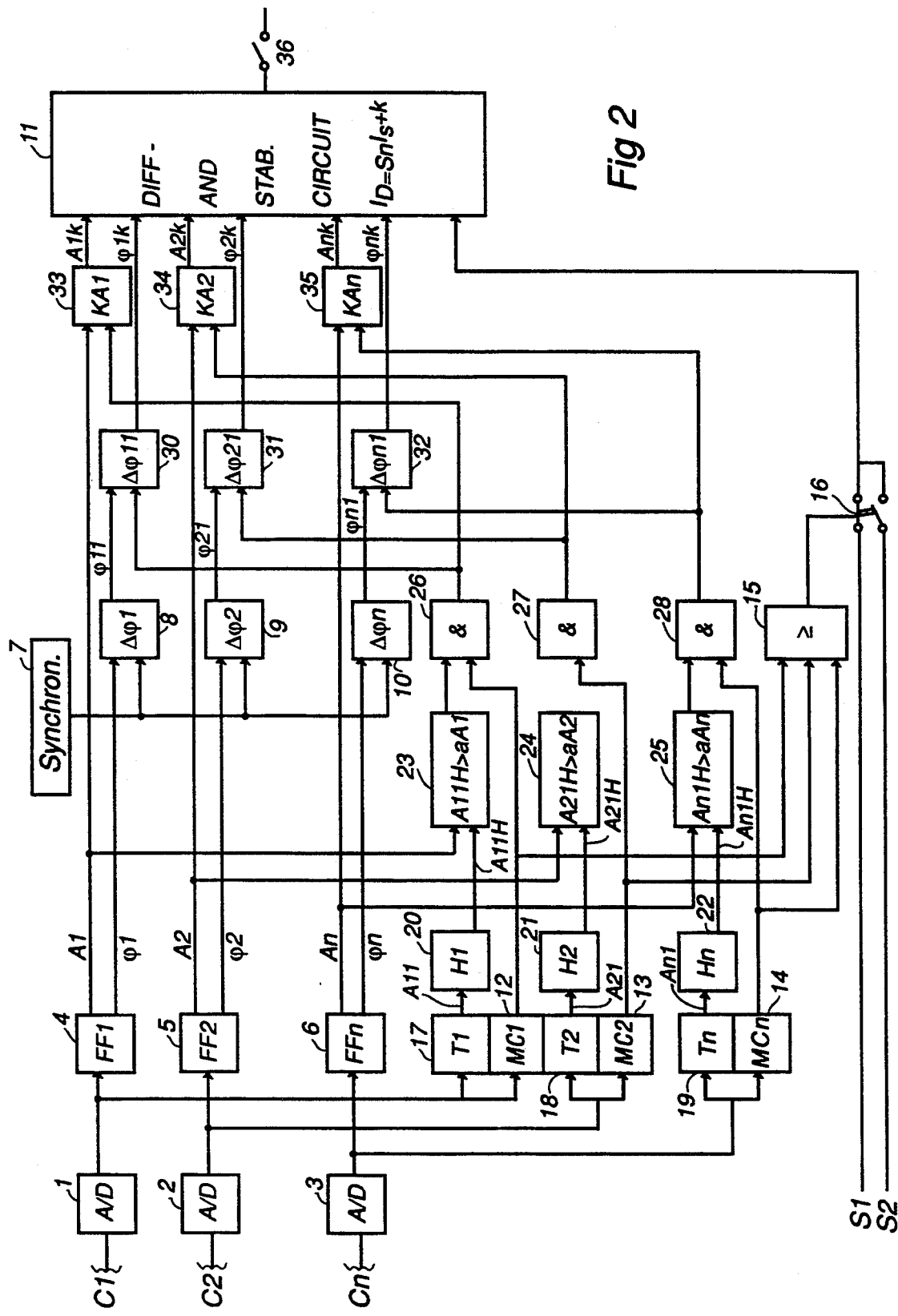
FIG. 2 shows how, according to the invention, the basis for determining the current differential and stabilizing currents is changed when current transformer saturation occurs.

An embodiment of a device according to the invention for preventing understabilization of longitudinal differential protections in case of external faults and current transformer saturation is shown in FIG. 2. Since the invention constitutes an extension of the state of the art with regard to stabilization of longitudinal differential protections when current transformers become saturated, the device and FIG. 2 comprise certain parts from FIG. 1 which have been described in connection with the description of that figure.

The parts shown jointly in FIGS. 1 and 2 consist of the current transformers C1, C2 and Cn, the Fourier filters 4, 5 and 6, the global clock 7 for synchronization, the synchronization units 8, 9 and 10, the decision unit 11, comprising, inter alia, the circuits for obtaining differential and stabilizing current, saturation detectors 12, 13 and 14, an or element 15 and the contact system 16 for switching of the stabilizing degree S.

The extension means that a device according to the invention, in addition to the above-mentioned parts, comprises peak value formers T1, T2 and Tn with reference numerals 17, 18 and 19 for determining the peak values of the currents with the aid of two consecutive samples. The output signals from these are designated A11, A21 and An1. Via holding circuits H1, H2 and Hn with the reference numerals 20, 21 and 22, the last determined peak values are stored, which according to the above are called holding amplitudes and are designated A11H, A21H and An1H. The holding amplitudes are each supplied, together with the corresponding Fourier amplitudes, to a comparison means 23, 24 and 25 to decide on the inequalities A11H>a·A1, A21H>a·A2 and An1H>a·An, where "a" is a first constant greater than 1. Now, if one or more of the inequalities is/are true, this means that a change has taken place with respect to the relationships between the holding amplitudes and the Fourier amplitudes. If, in addition, saturation has been detected, the conclusion can be drawn, as stated under the summary of the invention, that the Fourier amplitude has a relatively low value when saturation has been detected. This then means that both the criteria for correction of the Fourier amplitudes A1, A2 and An and the phase angles $\phi 11$, $\phi 21$ and $\phi n1$ are fulfilled and that the correction can be initiated via the AND elements 26, 27 and 28. The correction means that the phase angles are reduced by the phase changes $\Delta\phi 11$, $\Delta\phi 21$ and $\Delta\phi n1$ in the phase angle correction units 30, 31 and 32. The output signals from here constitute the corrected phase angles $\phi 1k$, $\phi 2k$ and $\phi nk$ which are supplied to the decision unit 11. Further, the correction means that the Fourier amplitudes are multiplied by the constants KA1, KA2 and KAn in the amplitude correction units 34, 35 and 36. The output signals from here constitute the corrected Fourier amplitudes A1k, A2k and Ank which are also supplied to the decision unit 11. In the same way as shown in FIG. 1, the necessary protective measures are activated via the contact 36 when the limits of the function characteristic are exceeded. The phase changes $\Delta\phi 11$, $\Delta\phi 21$ and $\Delta\phi n1$ can be set at one and the same value $\Delta\phi$ between 0 and −30 degrees to simplify the design. In similar manner, the constants KA1, KA2 and KAn can also be set at one and the same second constant KA between 1 and 2. The first constant "a", which is part of the basis for decision whether correction is to take place or not, suitably assumes a value between 1 and 2.

We claim:

1. A method for preventing understabilization of longitudinal differential protections in case of external faults and current transformer saturation, comprising the steps of filtering the measured, sampled currents of the longitudinal differential protection, obtained via current transformers and A/D converters by means of Fourier filters, and producing the Fourier amplitudes (A1, A2, ... An) and phase angles ($\phi 1$, $\phi 2$, ... $\phi n$) of the respective current vectors, synchronizing the phase angles together with the Fourier amplitudes, determining the function characteristic of the longitudinal differential protection, and using the sampled currents for detecting whether any current transformer has become saturated, increasing the stabilizing degree (S) included in the function characteristic with any current transformer being saturated, selecting the peak values of the sampled currents with the aid of two consecutive sample values for each cycle and selecting the holding amplitudes (A11H, A21H, ... An1H) of the currents as the last selected peak values and consecutively stored in holding circuits, and detecting if one or more of the holding amplitudes is/are greater than the respective Fourier amplitude multiplied by a first constant (a), and if at the same time detecting saturation, multiplying the Fourier amplitude by a second constant (KA) into a higher value (A1k, A2k, ... Ank) and reducing the phase angle by a phase change ($\Delta\phi$) into a lower value ($\phi 1k$, $\phi 2k$, ... $\phi nk$), and obtaining a corrected function characteristic from the values of Fourier amplitude and phase angle.

2. A method for preventing understabilization of longitudinal differential protections in case of external faults and current transformer saturation according to claim 1, wherein the first constant (a) has a value between 1 and 2, the second constant (KA) has a value between 1 and 2 and the phase change ($\Delta\phi$) has a value between 0 and −30 degrees.

3. A device for preventing understabilization of longitudinal differential protections in case of external faults and current transformer saturation, comprising: current transformers, A/D converters and Fourier filters for determining the Fourier amplitudes (A1, A2, ... An) and phase angles ($\phi 1$, $\phi 2$, ... $\phi n$) of measured and sampled currents, a decision unit including circuits for producing the differential and stabilizing current of the longitudinal differential protection as well as the function characteristic of the protection, saturation detectors, which upon a detected saturation via a switching system, change the stabilizing degree (S) of the function characteristic, peak value formers for determining the peak values (A11, A21, ... An1) of the measured currents with the aid of two consecutive samples, holding circuits for consecutively storing the holding amplitudes (A11H, A21H, ... An1H) in the form of the last determined peak values, comparison means for determining the inequalities of the holding amplitudes in relation to the Fourier amplitudes multiplied by a first constant (a) and, if the inequality is true while at the same time current transformer saturation is detected, amplitude correction units for multiplying the Fourier amplitudes by a second constant (KA) and said angle correction units reducing the phase angles by a given phase change ($\Delta\phi$) and said decision unit receiving the corrected Fourier amplitudes (A1k, A2k, ... Ank) and the phase angles ($\phi 1k$, $\phi 2k$, ... $\phi nk$).

4. A device for preventing understabilization of longitudinal differential protections in case of external faults and current transformer saturation according to claim 3, wherein the first constant (a) has a value between 1 and 2, the second constant (KA) has a value between 1 and 2, and the phase change ($\Delta\phi$) has a value between 0 and −30 degrees.

* * * * *